(No Model.)

C. CALLAHAN.
COUPLING FOR UNITING STREAMS FROM FIRE ENGINES.

No. 276,131. Patented Apr. 17, 1883.

Witnesses.
Inventor.
Cornelius Callahan,
by Crosby & Gregory
Attys

UNITED STATES PATENT OFFICE.

CORNELIUS CALLAHAN, OF CHELSEA, MASSACHUSETTS, ASSIGNOR TO THE AMERICAN FIRE HOSE MANUFACTURING COMPANY, OF SAME PLACE.

COUPLING FOR UNITING STREAMS FROM FIRE-ENGINES.

SPECIFICATION forming part of Letters Patent No. 276,131, dated April 17, 1883.

Application filed November 18, 1881. (No model.)

*To all whom it may concern:*

Be it known that I, CORNELIUS CALLAHAN, of Chelsea, Massachusetts, have invented an Improvement in Couplings for Uniting Streams from Fire-Engines, of which the following description, in connection with the accompanying drawings, is a specification.

Couplings for uniting streams from fire-engines as now commonly made for fire-department equipment are composed of a triangular cast-metal box. This box has at one end two or more inlet collars or water-ways, and at its other end one outlet collar or water-way. The inlet-collars are screw-threaded to have united with them two or more lines of hose-pipes leading to one or more fire-engines, while the outlet-collar permits the water in the coupling to be discharged therefrom as one stream through a discharge-pipe. This coupling, commonly laid upon the ground and tied or secured to a bar driven therein, has connected with its outlet-collar a stiff rigid pipe or nozzle which is very hard to hold, and when the coupling is to be moved or turned to change the direction of the stream requires a very considerable expenditure of strength.

I am aware that couplings of this sort have been provided with swiveling discharge-pipes to change the direction of the stream without turning the coupling. In this my invention I have provided the coupling with a pivoted pintle, which, when the coupling is in use, is placed in a hollow step connected with a base-board or foot-piece provided with a hole through which a metal spike may be driven into the ground to hold the foot-piece stationary.

A coupling with a pintle, such as described, may be readily turned in any desired direction, horizontally and up and down, and consequently the rigid discharge-pipe in connection therewith may be placed in any position the resultant of such movements; but it will be noticed in this my invention that the water entering the coupling through two or more collars at its large end is discharged therefrom through a single outlet-collar at one of its corners, and substantially in a direct line, so as not to impede the outward flow of the water by abrupt turns between the inlet and outlet.

Figure 2:
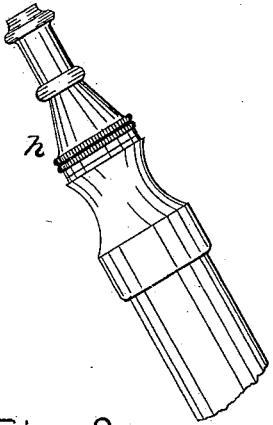
Figure 2:
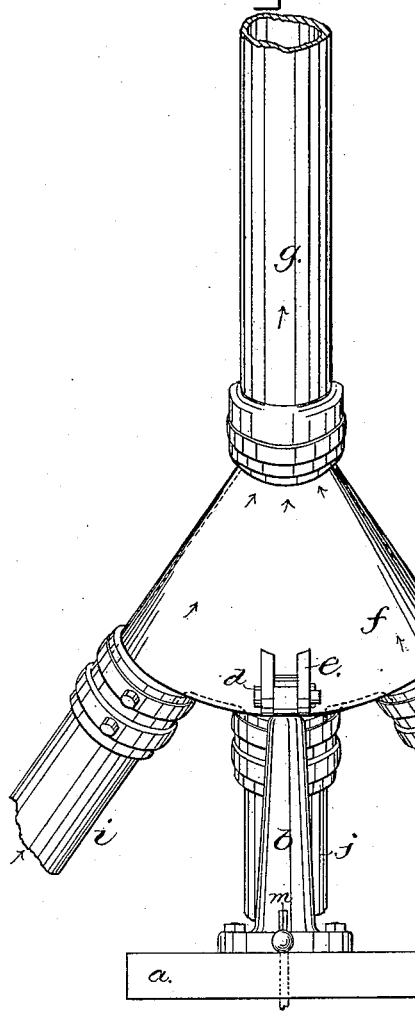
Figure 1:
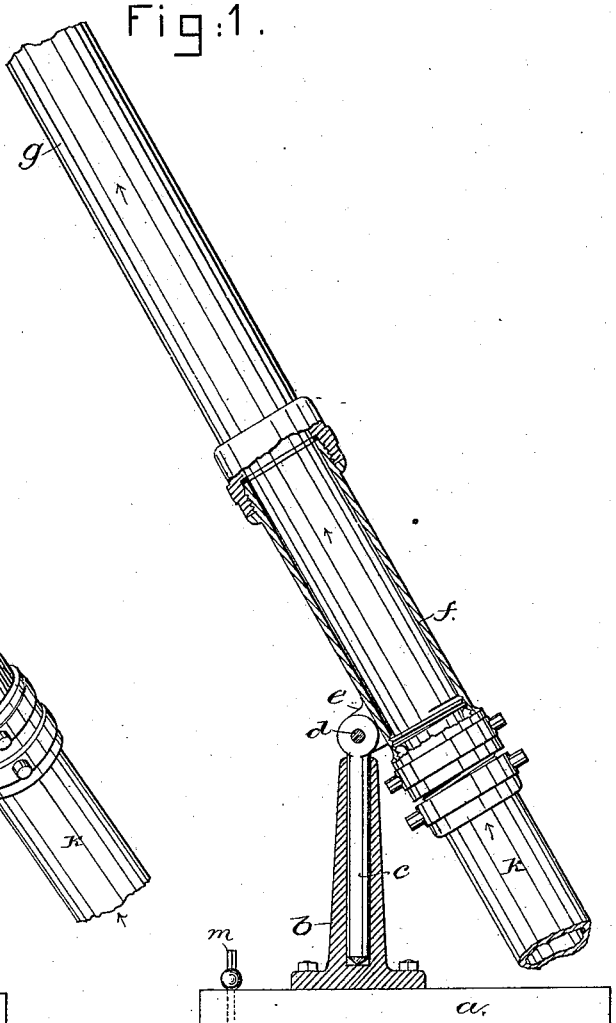

Figure 1 represents in front view a sufficient portion of a coupling of the class referred to and its attached parts to illustrate my invention, and Fig. 2 a partial side elevation and section of the same.

The base $a$, preferably a strong board or foot-piece, may be secured in place on the ground by means of a headed and sharpened bolt, $m$, driven through a hole in the base and into the ground. The base $a$ has attached to and rising from it a bearing or step, $b$, open at top, in which is placed the pintle $c$, pivoted at $d$ upon an ear, $e$, of the coupling $f$. The coupling $f$, having its pivoted pintle inserted in the step $b$, may be turned freely up and down on the pivot $d$ and be rotated horizontally by reason of the pintle $c$ in the step $b$. The coupling, supported as described, may be readily turned in any desired direction at the will of the fireman holding the discharge-pipe $g$, which in practice will be a rigid metal pipe, having any usual removable end piece, $h$, through which the water forced into the coupling from the three lines of hose $i$ $j$ $k$ will be discharged.

The pipe $g$, in practice, will be provided with suitable loops near its outer end, to serve the purpose of handles. The pipe $g$ may be of any desired length. In practice it will be about thirty inches long.

Instead of the base $a$, (shown as a base-board or foot-piece,) the step $b$ may be provided at bottom, if desired, with a broad metal foot or base and an attached spike.

When not in actual use the pintle will be removed from the step.

I claim—

The coupling $f$, for uniting the streams from fire-engines, provided with ears $e$ and the pintle $c$, secured by a pin, $d$, in said ears, to permit the vertical movement of said coupling, combined with the bearing or step $b$ to receive said pintle to permit horizontal movement of said coupling and its disconnection from its support, the base $a$, and anchoring devices $m$, all constructed and arranged to operate substantially as shown and described.

In testimony whereof I have signed my name to this specification in the presence of two subscribing witnesses.

CORNELIUS CALLAHAN.

Witnesses:
BERNICE J. NOYES,
G. W. GREGORY.